March 2, 1937.   A. KUHNS ET AL   2,072,561
COUPLING
Filed Dec. 31, 1934   6 Sheets-Sheet 3

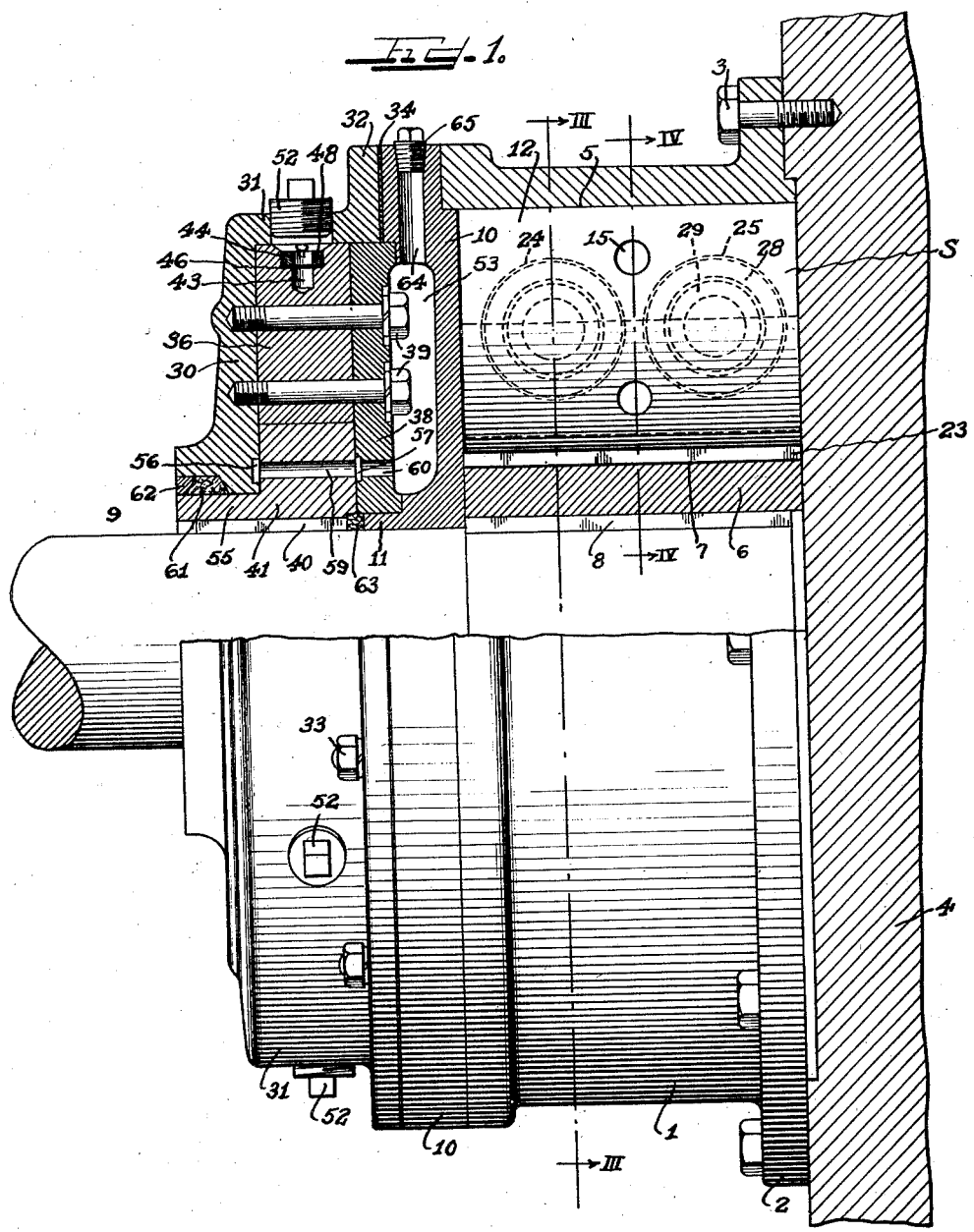

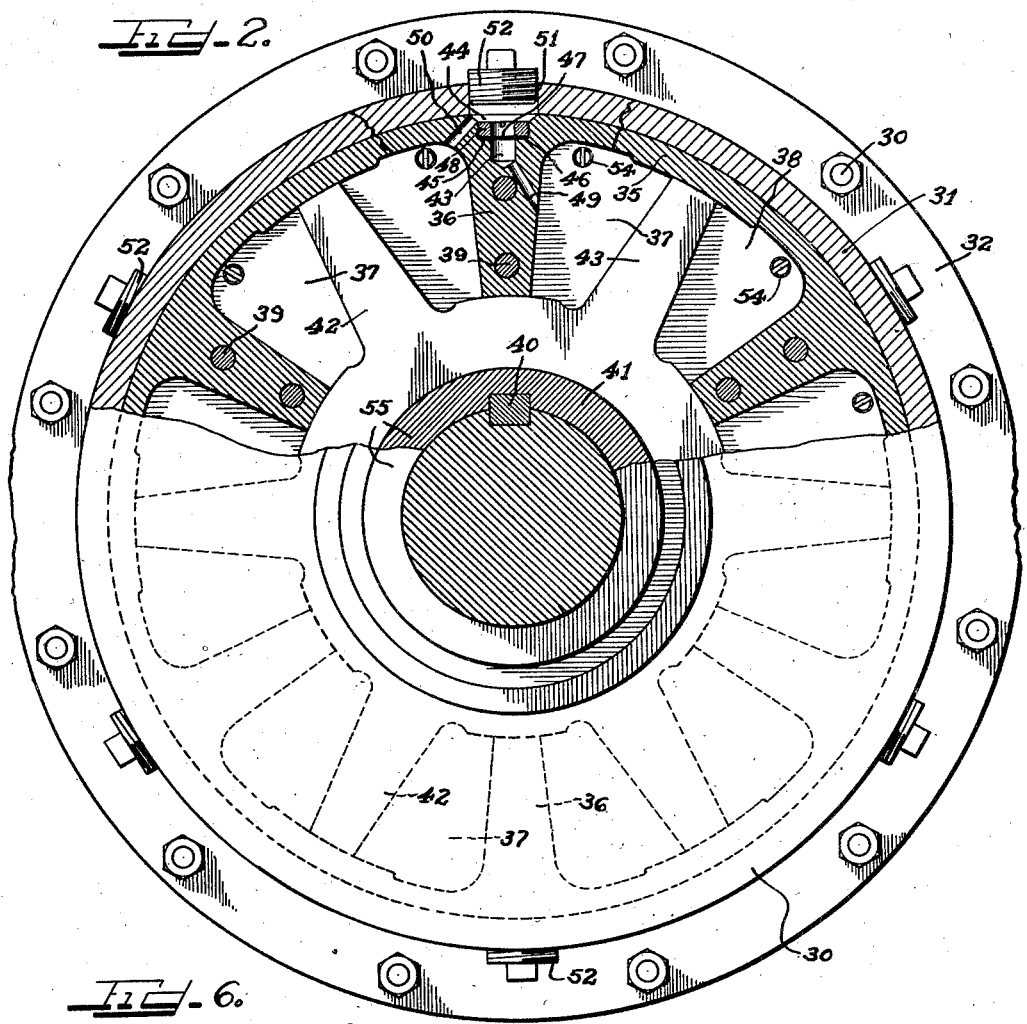
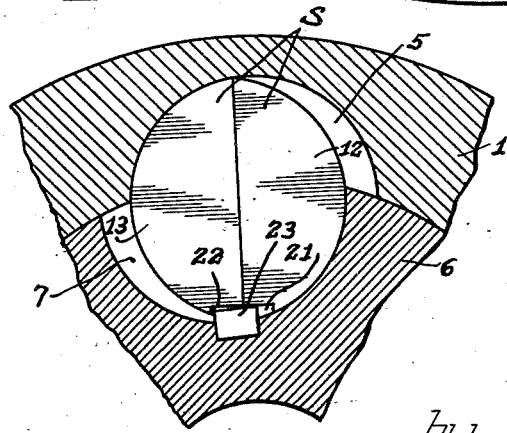

Inventors
Carl F. Lautz.
Austin Kuhns.
Charles O. Mills Attys

March 2, 1937.  A. KUHNS ET AL  2,072,561
COUPLING
Filed Dec. 31, 1934   6 Sheets-Sheet 4
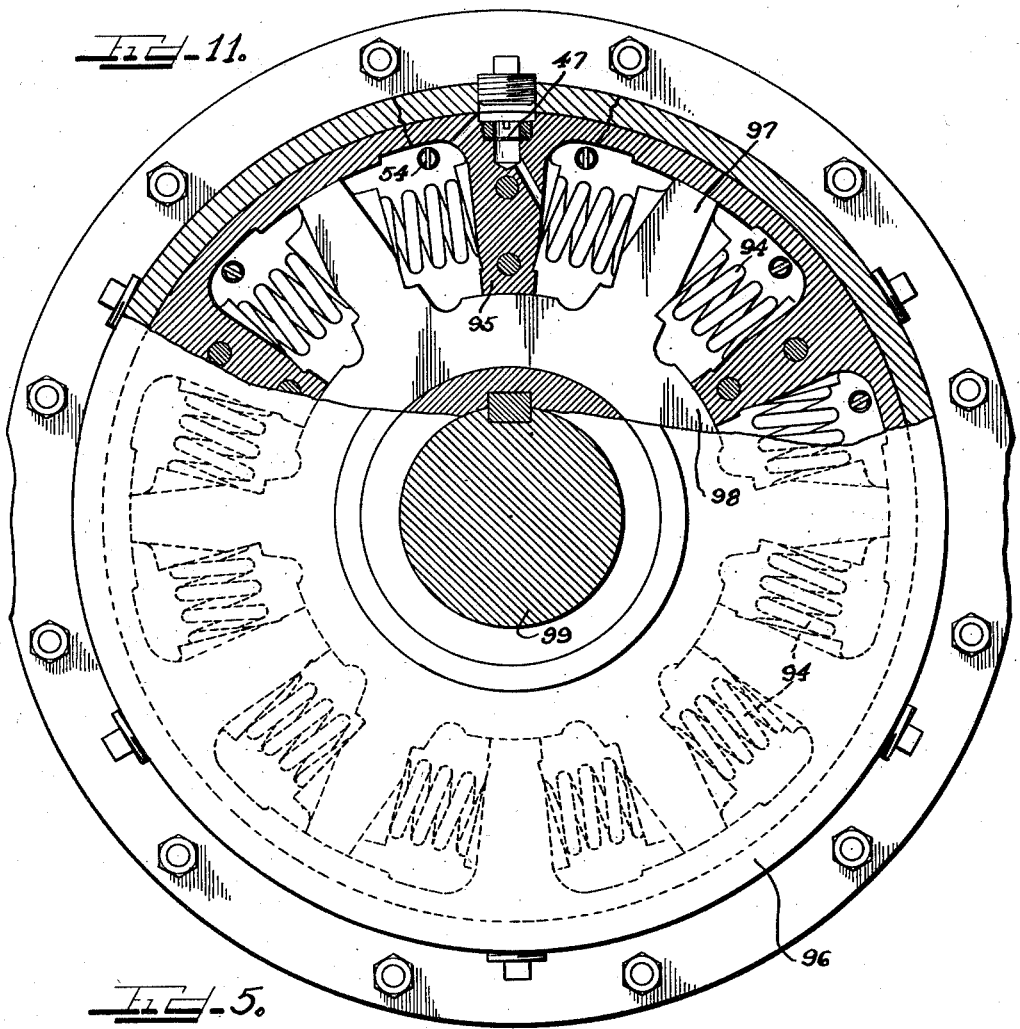
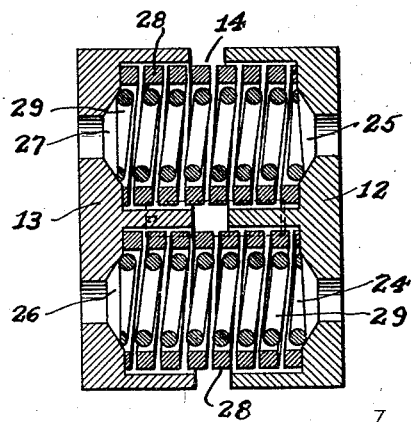
Inventors
Carl F. Lautz.
Austin Kuhns.

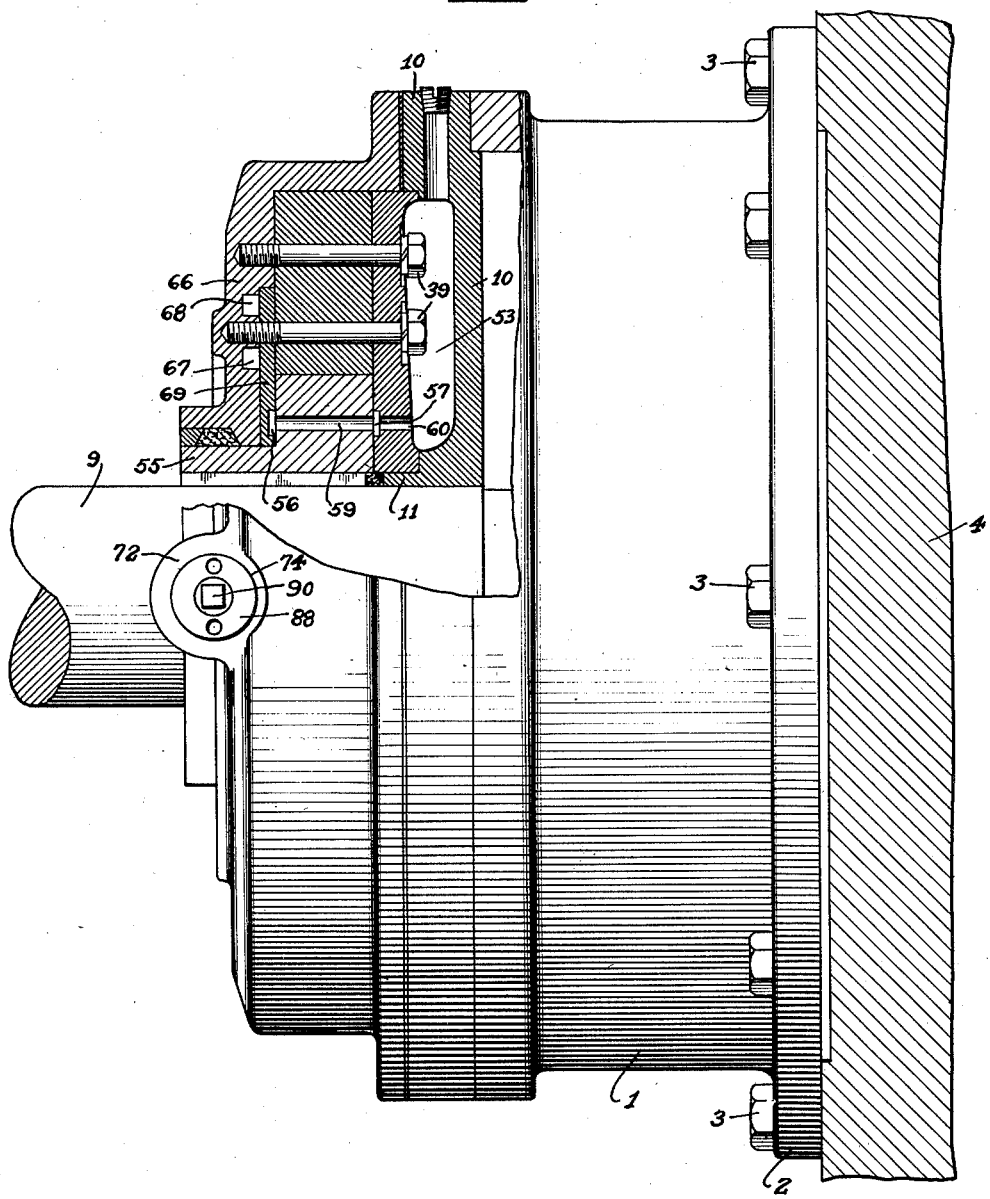

March 2, 1937.  A. KUHNS ET AL  2,072,561
COUPLING
Filed Dec. 31, 1934   6 Sheets-Sheet 6
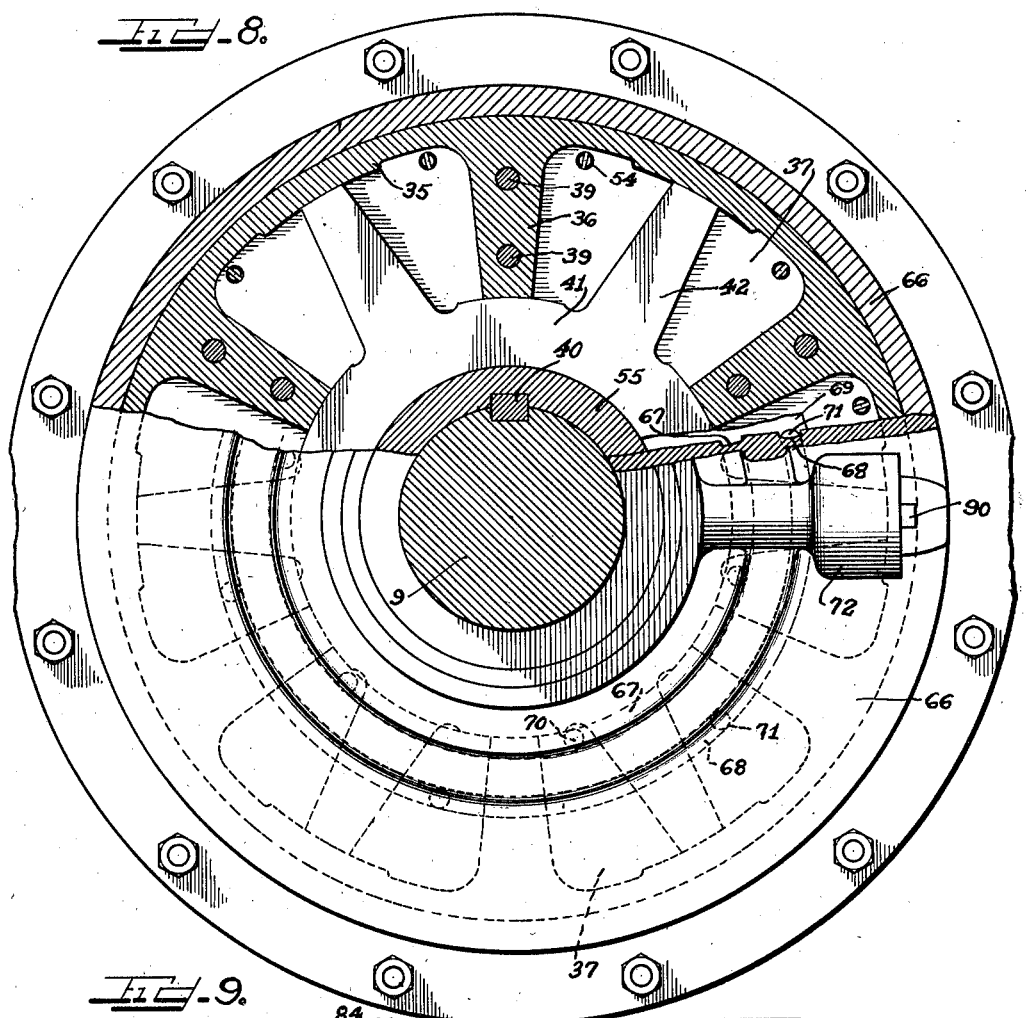
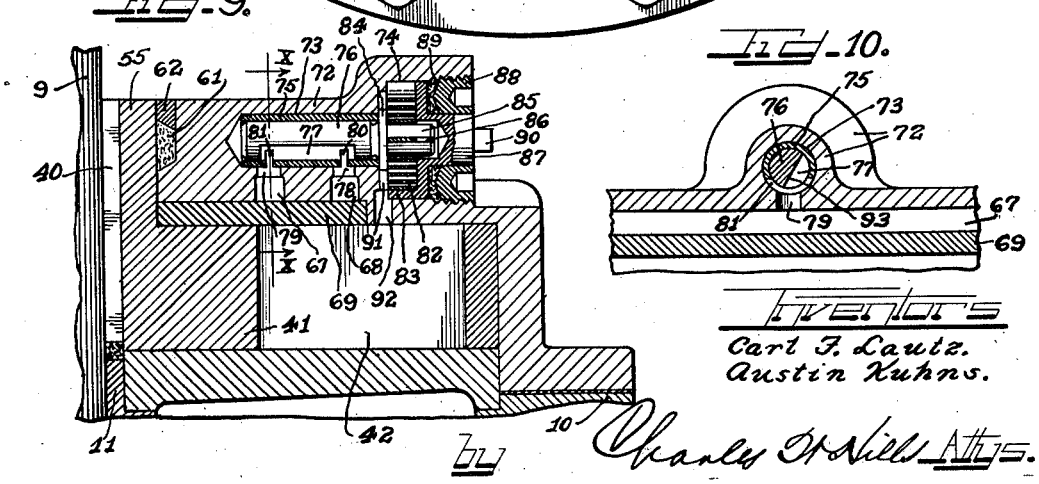
Inventors
Carl F. Lautz.
Austin Kuhns.
by Charles O'Neill Attys.

Patented Mar. 2, 1937

2,072,561

UNITED STATES PATENT OFFICE 2,072,561

COUPLING

Austin Kuhns and Carl F. Lautz, Buffalo, N. Y.; said Kuhns assignor to Farrel-Birmingham Co. Inc., Buffalo, N. Y., a corporation of New York, and said Lautz assignor to Houde Engineering Corporation, Buffalo, N. Y., a corporation of New York Application December 31, 1934, Serial No. 759,917

3 Claims. (Cl. 64—27)

This invention relates to couplings, particularly to hydraulically controlled yieldable coupling structure for connecting together driving and driven elements.

An important object of the invention is to provide improved coupling structure of the class referred to in which yieldable torque transmitting means, such as springs, are employed, and adjustable and regulatable hydraulic means for controlling the spring action both during compression and rebound of the springs to thereby gradually and uniformly transmit the driving torque from one element to another and to absorb and counteract torsional impact and vibration and eliminate the interpassage of disturbing vibrations between the elements.

Another object of the invention is to provide an arrangement in which the hydraulic control of the spring action is accomplished by the resistance to flow of the hydraulic fluid through a metering passage or orifice together with means for automatically compensating for variation in temperature and viscosity of the hydraulic fluid.

The above referred to, and other features involving construction, arrangement and operation, are incorporated in the structure disclosed on the accompanying drawings, in which drawings:

Figure 1 is a side elevation of the coupling structure, partly in vertical diametral section;

Figure 2 is an end view of the structure disclosed in Figure 1;

Figure 5 is a section on plane V—V of Figure 4;

Figure 6 is a section similar to Figure 4 showing one of the spring elements in compressed position;

Figure 7 is a side elevation partly in section and showing the application of thermostat fluid controlling means;

Figure 8 is an end view of the structure shown in Figure 7;

Figure 9 is an enlarged section on plane IX—IX of Figure 8;

Figure 10 is a section on plane X—X of Figure 9;

Figure 11 is an end view, partly in section, showing a modified arrangement.

Figure 3:
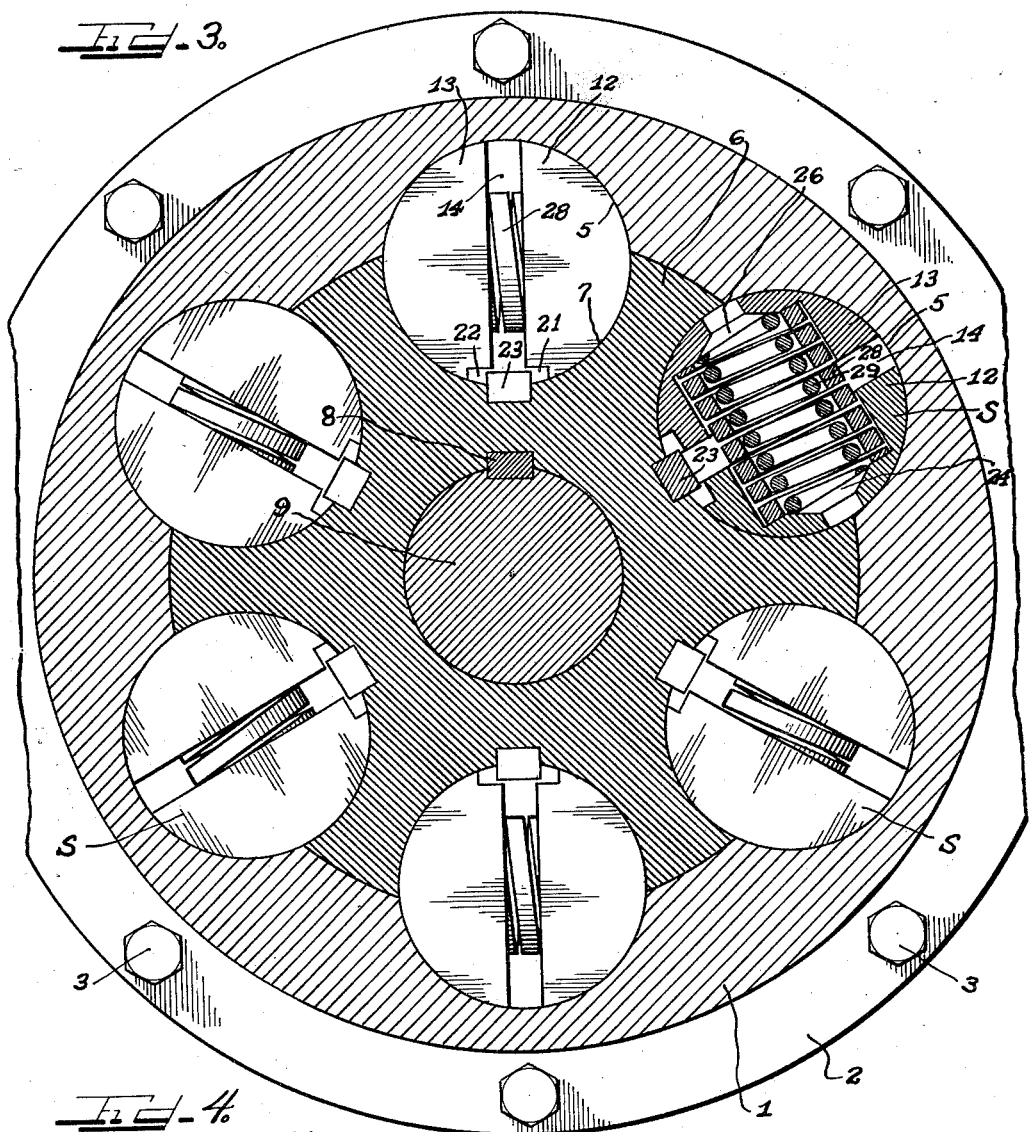
Figure 3 is a section on plane III—III of Figure 1.
Figure 4:
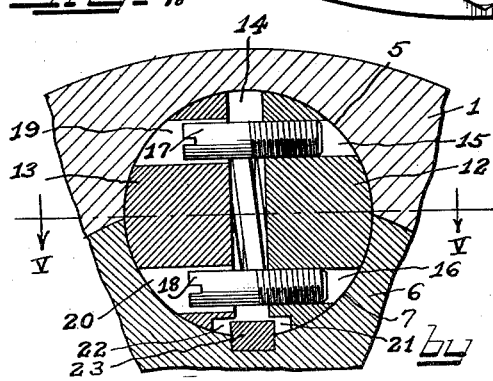
Figure 4 is a section on plane IV—IV of Figure 1.

Referring to Figures 1 to 6, the structure comprises a cylindrical housing 1 having a seating flange 2 whereby it may be secured to a support. As shown it is secured as by means of bolts 3 to the side of the fly wheel 4 of an internal combustion engine which in this case is the driving element, the housing being concentric with the engine shaft. On its inner side, the annular housing wall has a number of semi-cylindrical pockets or recesses 5 whose axes are parallel with the wall axis. Any number of such pockets may be provided, six being shown equally spaced apart.

Fitting in the annular housing 1 is a cylindrical hub 6 which has the semi-cylindrical pockets or recesses 7, six such pockets being shown and which normally register with the pockets 5 to form cylindrical chambers to receive the spring assemblies S. The hub 6 is secured, as by a key 8, to a shaft 9 which extends to some structure (not shown) to be driven by the engine. A wall 10 forms the closure for the outer end of the housing 1 whose inner end may be closed by the fly wheel 4, as shown. The wall 10 has the bearing flange 11 for receiving the shaft 9, the hub and shaft being held against axial displacement by the engagement of the wall 10 and the fly wheel with the sides of the hub 6, the spring assemblies S being also held against axial displacement by the wall 10 and the fly wheel. It is to be understood that, instead of the fly wheel shown, another wall could be provided for closing the inner end of the housing 1 and such wall connected by a shaft with a driving element, such as an engine.

Each spring assembly comprises substantially semi-cylindrical abutment blocks 12 and 13 separable to the extent of the space 14 and which extends in a radial plane relative to the axis of the housing 1 so that the blocks will be partially in the corresponding pocket 5 in the housing 1 and partially in the corresponding pocket 7 in the hub 6. Midway between its ends each block 12 has threaded outer and inner bores 15 and 16 for receiving pins 17 and 18 respectively which extend into registering openings 19 and 20 in the associated block 13, these pins holding the blocks against relative rotational movement. At their lower edges adjacent to the space 14 the blocks have the recesses 21 and 22 respectively for receiving an abutment bar 23 seated in the hub 6 and projecting a distance into the cylindrical chamber receiving the assembled block, the engagement of the side walls of the recesses with the bar limiting the rotational displacement of the block assembly in its supporting chamber.

As shown, each block 12 has spring seating pockets 24 and 25 which register with similar pockets 26 and 27 in the companion block 13. The opposed pockets 24 and 26 receive the ends of an outer helical spring 28 and an inner helical spring 29 and the opposed pockets 25 and 27 receive similar springs. These spring clusters are under initial compression and tend to hold the blocks 12 and 13 in seating engagement with the opposite sides of the cylindrical supporting chamber normally formed by the opposed pockets 5 and 6, such normal position being shown in Figures 3 and 4.

The spring clusters tend to maintain the normal relative positions of the pockets 5 and 6 but when the driving member 1 of the spring coupling structure is rotated against the resistance of the structure to be driven by the shaft 9, the driving member or housing 1 will rotate relative to the hub 6 on the driven shaft, such relative movement moving the blocks 12 and 13 of the spring coupling assemblies S toward each other as shown in Figure 6. Such relative movement is of course resisted by the spring clusters and if the relative movement is sufficient the spring abutment blocks will be brought into contact with each other and then the coupling connection between the housing 1 and the hub 6 will be direct and independent of the springs. The pins 17 and 18 will guide the relative movement of the respective blocks 12 and 13 so that the spring clusters will be uniformly compressed, and the bar 23 will prevent the rotational displacement of the coupling units so that the compression effort will be along the axes of the spring clusters. The spring units S will thus yieldably and gradually transmit the driving torque from the driving element 1 to the shaft 9 and the element to be driven.

Describing now the hydraulic control associated with the spring coupling units, the hydraulic structure is at the outer end of the housing 1 concentric therewith. It comprises the outer wall 30 having the annular cylindrical wall 31 extending therefrom and terminating in a seating flange 32 for seating against the wall 10 which forms the outer closure for the housing 1, bolts 33 extending through the flange 32 and the wall 10 and threading into the housing wall 1, a leakage preventing gasket 34 being interposed between the flange 32 and the wall 10. Seating in the peripheral wall 31 and abutting the outer wall 30 is the ring 35 having the partition lugs 36 integral therewith and extending radially to define the side walls of the hydraulic working chambers 37, six such partition lugs, equally spaced apart, being shown. An inner closure wall or disc 38 fits into the peripheral wall 31 and abuts the inner side of the ring 35 and partition lugs 36, and screws 39 extend through the inner wall and the partition lugs and thread into the outer wall 30 to rigidly secure the inner wall and the partition lug structure to the outer wall 30. The inner wall 38 has an opening for receiving the outer end of the bearing flange 11 on the wall 10.

Secured as by a key 40 to the shaft 9 is the piston hub 41 which has piston vanes 42 extending radially therefrom to the inner surface of the partition structure ring 35, the vanes being six in number and extending between the partition lugs 36. The housing structure on which the partition lugs are secured rotates with the driving element 1 and the piston structure rotates with the driven shaft 9. When the driving element rotates relative to the driven element the hydraulic fluid in the working chamber 37 will be displaced by the relatively moving partition lugs and piston vanes.

The resistance to the flow of the displaced hydraulic fluid will determine the hydraulic control of the operation of the spring coupling units S. The resistance to flow is provided by restricted passageways through the partition lugs. As best shown in Figure 2, each partition lug has a radially extending bore 43 in its outer end and a counter bore 44 providing a valve seat 45 for receiving a valve or metering structure which may be in the form of a thin metal disc 46 having a restricted sharp edge orifice 47 therethrough, the disc being held in place by an annular clamping member 48 threading into the counter bore 44 to clamp the valve disc to the seat 45. A passage 49 in each partition lug connects the inner bore or chamber 43 with the working chamber 37 on the corresponding side of the lug while a passage 50 connects the bore outside of the valve disc with the working chamber at the opposite side of the partition lug so that fluid flow between adjacent working chambers is through the restricted orifice 47 which determines the resistance to such flow. In order that the metering disc and its securing member 48 may be readily inserted or removed, an access opening 51 is provided for each metering assembly in the peripheral wall 31 and a closure plug 52 is provided for the opening.

The accurate calibrating or metering of the fluid flow will check and regulate the movement of the coupling springs and will prevent the transmission of torsional impacts from the driving element 1 to the driven shaft 9, such impacts being gradually smoothed out by the hydraulic control so that the rotation of the driven element will be smooth and free from vibration or other disturbance.

The wall 10 has the annular recess 53 forming a reservoir for fluid for replenishing the hydraulic working chambers. The respective working chambers are connected with the reservoir by check valve controlled passages 54 through the inner wall 38, these passages permitting flow from the reservoir to the working chambers but preventing reverse flow.

In order that the piston structure may have ample support on the shaft 9 it has the extension hub 55 at its outer end which extends through an opening in the outer wall 30. To intercept any fluid which may leak between the piston structure and the adjacent side walls 30 and 38 of the housing an annular intercepting channel 56 is provided in the wall 30 adjacent to the piston hub and in the inner wall 38 an intercepting channel 57 is provided, these annular channels being connected by passages 59 through the piston hub, channels 60 through the wall 38 connecting the intercepting recess 57 with the reservoir 53 so that any fluid intercepted by the grooves 56 and 57 will be returned to the reservoir. Packing 61 is inserted between the wall 30 and the piston hub flange 55 and held in place by a gland 62 to prevent leakage to the exterior of any fluid which may have passed the intercepting channel 56. Packing 63 is also provided between the outer end of the bearing flange 11 on the wall 10 and the piston hub to prevent escape of any fluid which may have passed the intercepting channel 57. Through a passage 64 in the wall 10 leading to the reservoir 38 fluid may be charged into the reservoir, a closure plug 65 being provided for this filler passage.

On Figures 7 to 10 a modified arrangement is shown. The arrangement is substantially the same as that disclosed in Figures 1 to 6 except that, instead of individual flow control between adjacent working chambers, a common controlling valve is employed and is automatically thermostatically regulated for compensation of variations in temperature of the fluid. In the modified arrangement the outer wall 66 of the working chamber enclosing housing has two annular recesses 67 and 68 closed at their inner sides by the annular disc 69, some of the bolts 39 extending through this disc to hold it in place, the disc opening receiving the flange 55 of the piston hub. The recesses 67 and 68 form fluid collecting channels, the inner channel 67 being connected with the working chambers 37 at one end thereof by passages 70, while the outer channel 68 is connected with the working chambers at the other end thereof by passages 71, these passages being through the disc 69.

On the outer side of the wall 66 is a boss 72 which has the inner bore 73 and the outer bore 74 of larger diameter. The inner bore 73 forms a valve chamber and has the bushing 75 secured therein. A cylindrical valve plug 76 is journalled in the bushing and is slabbed off at one side intermediate between its ends to provide the valve passageway or port 77. Passages 78 and 79 in the boss 72 extend between the fluid channels 67 and 68 and the valve chamber and have communication with the valve port by way of ports 80 and 81 in the bushing 75, these ports being in the form of slots extending circumferentially in the bushing. When the valve plug is turned the degree of overlap of the ports 80 and 81 by the valve port 77 will determine the resistance to the flow of the fluid between the channels 67 and 68. Referring to Figure 8, when the driving element moves in counter-clockwise direction relative to the driven element, which is the piston structure, the displaced hydraulic fluid will flow from one end of the various working chambers through the passages 70 into the channel 67 and from there through the port 81 into the valve port 77 from where the fluid will return by way of the port 80, the channel 68, and passages 71 to the working chambers at the opposite ends thereof. During rebound of the driving spring structures S the fluid flow will be reversed, the displaced fluid flowing through the passages 71 to the channel 68, then through the valve structure and the channel 67 and passages 70 to the working chambers in the wake of the piston vanes. The rate of fluid flow, and consequently the hydraulic control of the operation of the transmission spring units S, is determined by the setting of the valve plug and the degree of exposure of the orifice ports 80 and 81 to the fluid flow.

We have shown thermostat means for automatically controlling the setting of the valve to compensate for variation in temperature of the hydraulic fluid. The thermostat element 82 is in the form of a coil of bimetal and is disposed within a cup 83 which fits into the outer bore 74 of the boss 72. A flange 84 on the valve plug is abutted by the inner portion of the thermostat element, the stem 85 on the valve plug extending into the cup 83. The thermostat coil at its inner end is secured in the slot 86 in the stem while the outer end of the coil is anchored to the cup 74.

The cup 83 has the lug 87 extending therefrom, an annular plug 88 threading into the bore 74 for holding the cup in position, packing 89 being interposed between the plug and the cup so as to prevent the escape of fluid. The lug has the polygonal end 90 for engagement by a wrench or suitable tool so that, after the plug 88 is loosened, the valve structure may be set manually for adjustment of the orifice passageway through the ports 80 and 81. After such adjustment the plug is tightened and then the thermostat element may function to automatically adjust the valve in accordance with temperature change in the fluid. Any fluid which may escape past the valve will be received in the space 91 and returned by passage 92 to the adjacent working chamber.

Referring particularly to Figure 10 it will be noted that the flat bottom 93 of the valve port 77 forms a vane surface against which the fluid flowing through the orifice ports 80 and 81 impinges. Such fluid pressure impact against this vane surface will tend to rotate the valve plug in a direction for further closure of the ports and for corresponding increase in the resistance to the fluid flow. This arrangement will prevent the transmission of violent torque impacts from the driving element to the driven element as the hydraulic resistance will immediately check such impacts by the movement of the valve for corresponding restriction of the fluid flow. The thermostat coil will function as a spring to return the valve to normal operating position after checking thereby of the impacts.

Instead of having the transmission spring unit located in a separate housing as shown in Figures 1 to 10, they could be located within the same housing structure which provides the hydraulic working chambers. Figure 11 shows such modified arrangement, the transmission springs 94 being interposed between the partition lugs 95 on the housing structure 96 forming the driving element and the vanes 97 on the piston structure 98 which forms the driven element and is secured to the shaft 99. With this arrangement the housing structure 96 may be secured directly to the fly wheel of a driving engine or may be secured to a shaft driven by an engine.

As shown, the fluid flow control arrangement may be the same as that shown on Figures 1 and 2, or the arrangement disclosed in Figures 7 to 10 could be used.

Our improved coupling is of particular utility in installations where internal combustion engines, such as high speed Diesel engines, are connected in parallel or tandem relation with the reduction gearing for slower drive of a driven element as for example the propeller shaft in marine craft. With a coupling associated with each of the engines in such installation the torsional vibrations of the engine will be damped and absorbed and their transmission to the reduction gearing prevented so that smooth and vibrationless drive of the driven element will result. Furthermore the couplings will prevent the building up of synchronous or sympathetic vibrations so that the efficient operation of any of the driving engines will not be disturbed or interfered with by other engines.

We have disclosed practical and efficient embodiments of the various features of our invention but we do not desire to be limited to the exact arrangement and operation shown and described as changes and modifications may be made without departing from the scope of the invention.

We claim as our invention:

1. In a coupling of the class described, the combination of rotary concentric driving and driven elements arranged one within the other, one of said elements having semi-cylindrical pockets therein and the other element having opposed cylindrical pockets, said opposed pockets normally aligning to define cylindrical chambers whose axes parallel the axis of said elements, opposed substantially semi-cylindrical abutment blocks in each cylindrical chamber with their inner faces extending substantially radially relative to the axis of said elements, the blocks in each chamber having opposed pockets, spring clusters mounted in the opposed pockets of each set of blocks with the axis of each spring cluster at right angles to the radial plane of the axis of said elements, the blocks in each chamber being normally separated at their inner faces whereby said spring clusters will be compressed during relative rotational transmitting movement between the driving elements and the driven elements, and abutments on one of said elements for limiting rotational displacement of said blocks thereby to hold the spring clusters in normal axial alignment.

2. In a coupling of the class described, the combination of rotary concentric driving and driven elements arranged one within the other and contacting along a cylindrical surface concentric with said elements, one of said elements having semi-cylindrical pockets therein and the other element having opposed cylindrical pockets, the opposed pockets defining cylindrical chambers whose axes parallel the axis of said elements, semi-cylindrical abutment blocks in each chamber with their inner faces normally separated a distance and extending substantially radially relative to the axis of said elements, the blocks at each chamber having opposed pockets, helical springs under initial compression located in the opposed pockets of the blocks in each chamber and with their axes at right angles to the radial lines of said element whereby relative rotary movement of said elements will be resisted by the springs, guide pins connecting between the blocks in each chamber for guiding the movements thereof toward and from each other and for preventing relative rotational displacement of the blocks, and an abutment in each chamber for preventing rotational displacement of the combined block and spring assembly therein.

3. A coupling of the class described comprising an outer annular member and an inner member concentric therewith, said members engaging along a cylindrical surface concentric with said members, one of said members being adapted for connection with a driving source and the other member being adapted for connection with structure to be driven, said members having equally spaced apart sets of opposed semi-cylindrical pockets normally registering to define cylindrical chambers whose axes parallel the axis of said elements, semi-cylindrical abutment blocks in each chamber with their inner faces normally separated a distance and with such faces in planes substantially radial relative to the axis of said elements, the blocks in each chamber having opposed pockets, helical springs in said pockets under initial pressure and with their axes at right angles to the radial line of said elements whereby relative rotational movement of said elements will be yieldably resisted, means associated with each set of blocks for preventing relative rotational displacement thereof, and means in each chamber for preventing rotational displacement of the block and spring assembly therein.

AUSTIN KUHNS.
CARL F. LAUTZ.